United States Patent
Wen et al.

(10) Patent No.: US 9,128,603 B2
(45) Date of Patent: Sep. 8, 2015

(54) HAND GESTURE RECOGNITION METHOD FOR TOUCH PANEL AND ASSOCIATED APPARATUS

(75) Inventors: Chao-Cheng Wen, Hsinchu Hsien (TW); Tsung-Fu Lin, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 450 days.

(21) Appl. No.: 13/052,427

(22) Filed: Mar. 21, 2011

(65) Prior Publication Data

US 2011/0242025 A1    Oct. 6, 2011

(30) Foreign Application Priority Data

Apr. 2, 2010    (TW) ................................ 99110276 A (51) Int. Cl.
G06F 3/041      (2006.01)
G06F 3/0488     (2013.01)

(52) U.S. Cl.
CPC .. G06F 3/04883 (2013.01); *G06F 2203/04104* (2013.01); *G06F 2203/04808* (2013.01)

(58) Field of Classification Search
CPC ................ G06F 3/04883; G06F 3/017; G06F 3/041–3/047; G06F 2203/04808; G06F 2203/04104

USPC ................................ 345/104, 156, 173–178; 178/18.01–18.09, 18.11
See application file for complete search history.

(56) References Cited

U.S. PATENT DOCUMENTS

| | | | |
|---|---|---|---|
| 5,825,352 A * | 10/1998 | Bisset et al. | 345/173 |
| 7,253,643 B1 * | 8/2007 | Seguine | 324/686 |
| 2002/0011987 A1 * | 1/2002 | Kitazawa | 345/156 |
| 2002/0126161 A1 * | 9/2002 | Kuzunuki et al. | 345/863 |
| 2009/0184934 A1 * | 7/2009 | Lin et al. | 345/173 |

* cited by examiner

*Primary Examiner* — Stephen Sherman
(74) *Attorney, Agent, or Firm* — Edell, Shapiro & Finnan, LLC (57) ABSTRACT

A hand gesture recognition method according to the present disclosure is applied to a touch panel comprising a plurality of sensors, each of which generating a sensing value according to a touch operation. The method includes providing a first reference value and a second reference value; generating a count value by counting a quantity of the sensing values that are greater than a threshold; determining the touch operation as a first hand gesture when the count value is greater than the first reference value but smaller than the second reference value; and determining the touch operation as a second hand gesture when the count value is greater than the second reference value.

11 Claims, 6 Drawing Sheets

HAND GESTURE RECOGNITION METHOD FOR TOUCH PANEL AND ASSOCIATED APPARATUS

CROSS REFERENCE TO RELATED PATENT APPLICATIONS

This patent application claims priority from Taiwan Patent Application No. 099110276, filed in the Taiwan Patent Office on Apr. 2, 2010, entitled "Hand Gesture Recognition Method for Touch Panel and Associated Apparatus", and incorporates the Taiwan patent application in its entirety by reference.

TECHNICAL FIELD

The present disclosure relates to a hand gesture recognition method and associated apparatus, and more particularly, to a hand gesture recognition method and associated apparatus according to the number of touched sensors of a touch panel.

BACKGROUND OF THE PRESENT DISCLOSURE

A touch panel is an input apparatus for moving a cursor by moving a finger on a smooth panel, and is frequently applied to laptop computers, mobile phones, personal digital assistants (PDA) or other electronic apparatus since the touch panel is extremely thin. For that the touch panel does not adopt a common mechanical design like a mouse or a keyboard, it is rather convenient to maintain the touch panel. As modern electronic products getting lighter and thinner day by day, the touch panel serving as an input apparatus becomes more widely applied.

A principle of the touch panel is that the number and positions of touches on the touch panel touched with a finger of a user are sensed by sensors on the touch panel, and sensing values corresponding to the touches are generated. A hand gesture recognition apparatus recognizes a hand gesture of the user according to the sensing values to perform a corresponding operation, e.g., moving a cursor, open a file, and the like.

Figure 1:
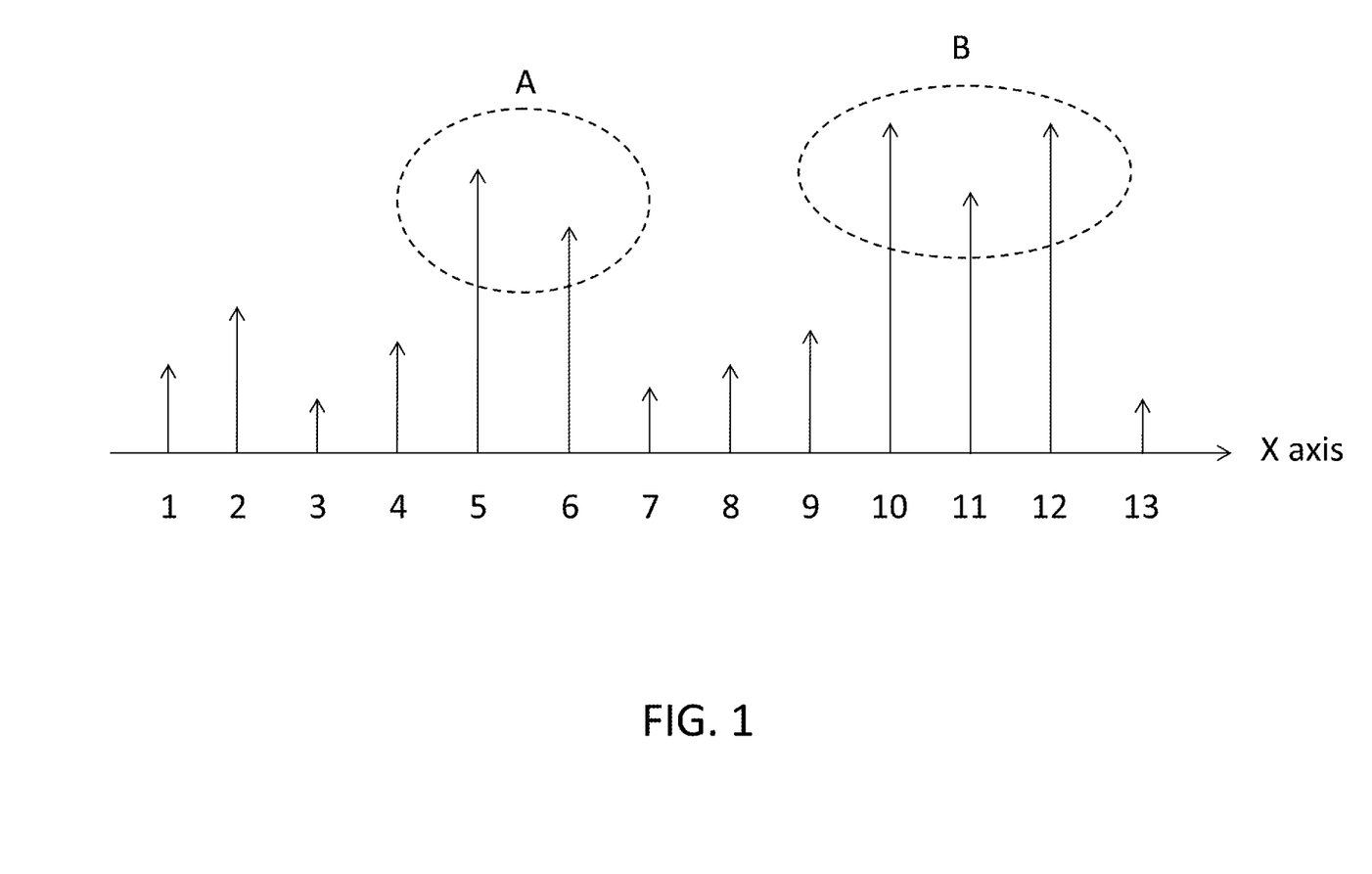
FIG. 1 is a schematic diagram showing corresponding electrical signals generated by sensors of a touch panel in response to a touch operation.

FIG. 1 shows a schematic diagram of a conventional touch panel that generates corresponding sensing values according to situations of touched sensors in areas of the touched panel. A plurality of sensors are disposed on the touch panel in a first coordinate axis direction (defined as an x axis). Taking a capacitive touch panel as an example, each of the sensors senses a voltage difference between a capacitor to generate a corresponding sensing value. The sensing values are different in response to situations of the touched sensors. In prior art, the number of fingers touching on the touch panel and a hand gesture are determined according to the number of peaks of a distribution of the sensing values, and a to-be-operated operation is accordingly determined Referring to a dashed ellipse A, a peak presents, meaning that an area on the touch panel corresponding to the peak is a touched point. A dashed ellipse B corresponds to another touched point. When there are simultaneously two touched points, it means that the touch panel is touched by two fingers. In the prior art, the hand gesture of the user is determined according to the number of fingers touching the touch panel, and different hand gestures correspond to different touch operations of the user. For example, when the user makes a first hand gesture, a system performs an operation of moving a cursor on a screen as the user moves a touched point; when the touch panel determines that the user makes a second hand gesture, the system performs an operation of scrolling a window as the user moves the touched point. Accordingly, the user may complete operations of different functions via different hand gestures on a same touch panel.

However, the foregoing conventional technique has disadvantages. For examples, when touched points are too close to each other, e.g., a child touches the touch panel with his two fingers, errors may occur in the determination mechanism of the conventional hand gesture recognition apparatus to misjudge the sensing values generated by the two fingers as being generated by one single finger since the corresponding sensing values generated by the sensors are too close to each other with reference to the dashed ellipse B in FIG. 1.

Therefore, a hand gesture recognition method applied to a touch panel and associated apparatus capable of more accurately and more effectively determining a hand gesture of the user is a key for determining whether the touch panel is more convenient applied.

SUMMARY OF THE PRESENT DISCLOSURE

In order to solve the foregoing problem, one object of the present disclosure is to provide a hand gesture recognition method applied to a touch panel and associated apparatus capable of recognizing a hand gesture according to the number of touched sensors on the touch panel to generate an operation corresponding to the hand gesture.

According to an embodiment of the present disclosure, a hand gesture recognition method applied to a touch panel comprising a plurality of sensors, each of which is used for generating a sensing value according to a touch operation is provided. The method comprises providing a first reference value, a second reference value and a threshold value; counting the number of sensing values greater than the threshold value to generate a count value; determining the touch operation as a first hand gesture when the count value is greater than the first reference value but is smaller than the second reference value; determining the touch operation as a second hand gesture when the count value is greater than the second reference value.

According to another embodiment of the present disclosure, a hand gesture recognition apparatus applied to a touch panel comprising a plurality of sensors, each of which is used for generating a sensing value according to a touch operation is provided. The apparatus comprises a storage, for storing a first reference value, a second reference value and a threshold value; a counter, for counting the number of sensing values greater than the threshold value to generate a count value; and a determining unit, for determining a corresponding hand gesture corresponding to the touch operation. When the count value is greater than the first reference value and is smaller than the second reference value, the determining unit determines the touch operation as a first hand gesture; and when the count value is greater than the second reference value, the determining unit determines the touch operation as a second hand gesture.

An advantage of the present disclosure is that, a hand gesture is determined according to the number of touched sensors on a touch panel to more accurately respond to a hand gesture of a user, so as to avoid misjudgment created due to different sizes of fingers of the user or two fingers being too close to each other, and a determination mechanism for design is more easily realized and is more flexible.

DETAILED DESCRIPTION OF THE PREFERRED EMBODIMENT

Figure 2:
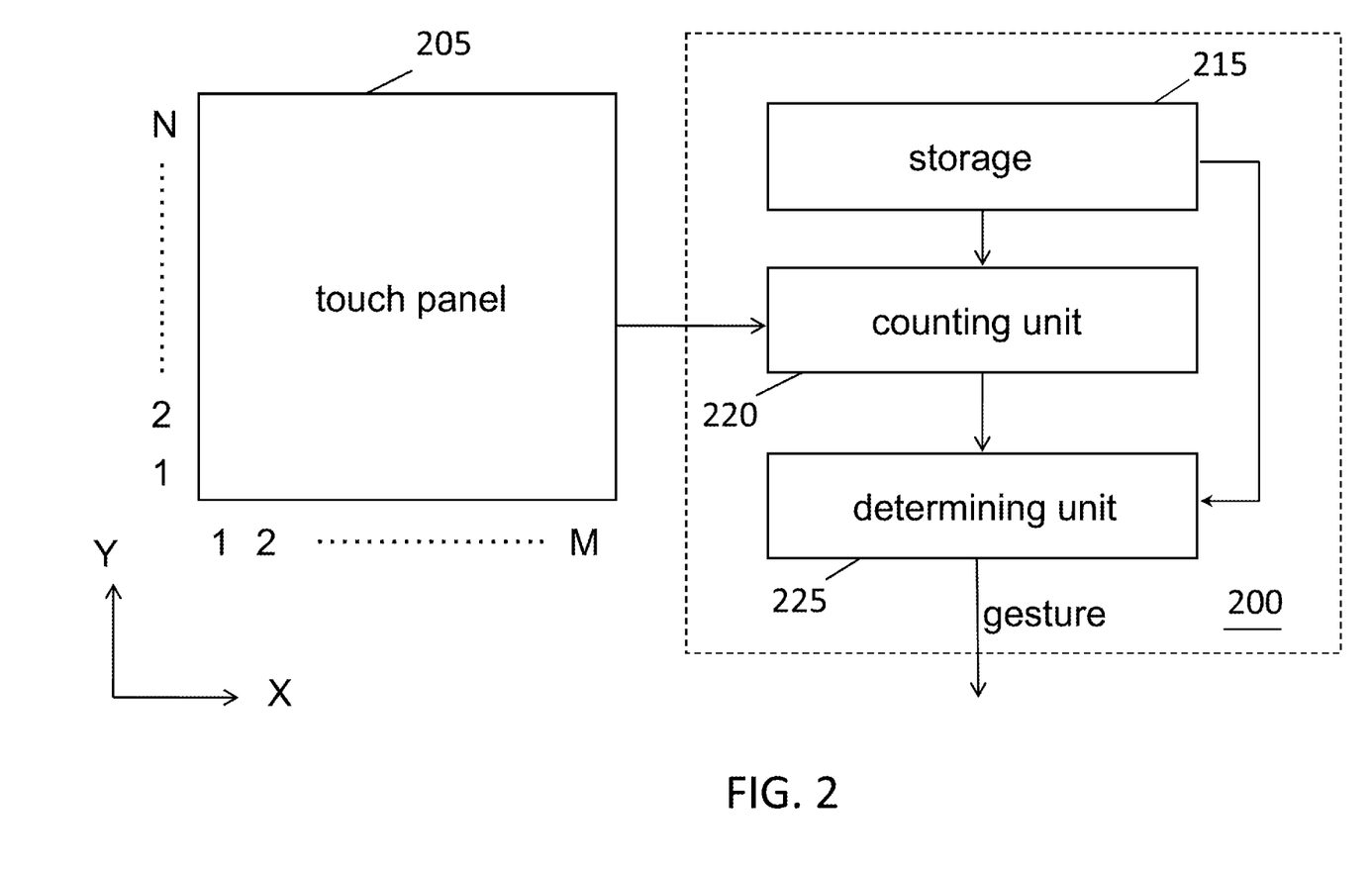
FIG. 2 is a block diagram of a hand gesture recognition apparatus in accordance with an embodiment of the present disclosure.

According to an embodiment of the present disclosure, a hand gesture recognition method capable of determining a hand gesture of a user according to the number of touched sensors on a touch panel is provided. FIG. 2 shows a block diagram of a hand gesture recognition apparatus in accordance with an embodiment of the present disclosure. A hand gesture recognition apparatus 200 comprises a storage 215, a counting unit 220, and a determining unit 225. The hand gesture recognition 200 is applied to a touch panel 205 comprising a plurality of sensors 1 to M in an X axis direction and a plurality of sensors 1 to N in a Y axis direction. The sensors 1 to M sense touched situations on the touched panel 205 in the X axis direction to generate a group of sensing values, and the sensors 1 to N sense touched situations on the touch panel 205 in the Y axis direction to generate another group of sensing values. The storage 215 stores various parameters for determining a hand gesture, e.g., a threshold value, a first reference value, a second reference value, and a reference threshold value. The storage 215 may be memories of various forms. The counting unit 220 generates a count value according to the sensing values in the X axis direction, the sensing values in the y axis direction and the threshold value stored in the storage 215. The determining unit 225 determines a hand gesture corresponding to a touch operation according to the count value and the reference values stored in the storage 215. Associated with a corresponding hand gesture recognition method and embodiment, operations of the hand gesture recognition apparatus 200 are described below.

Figure 3:
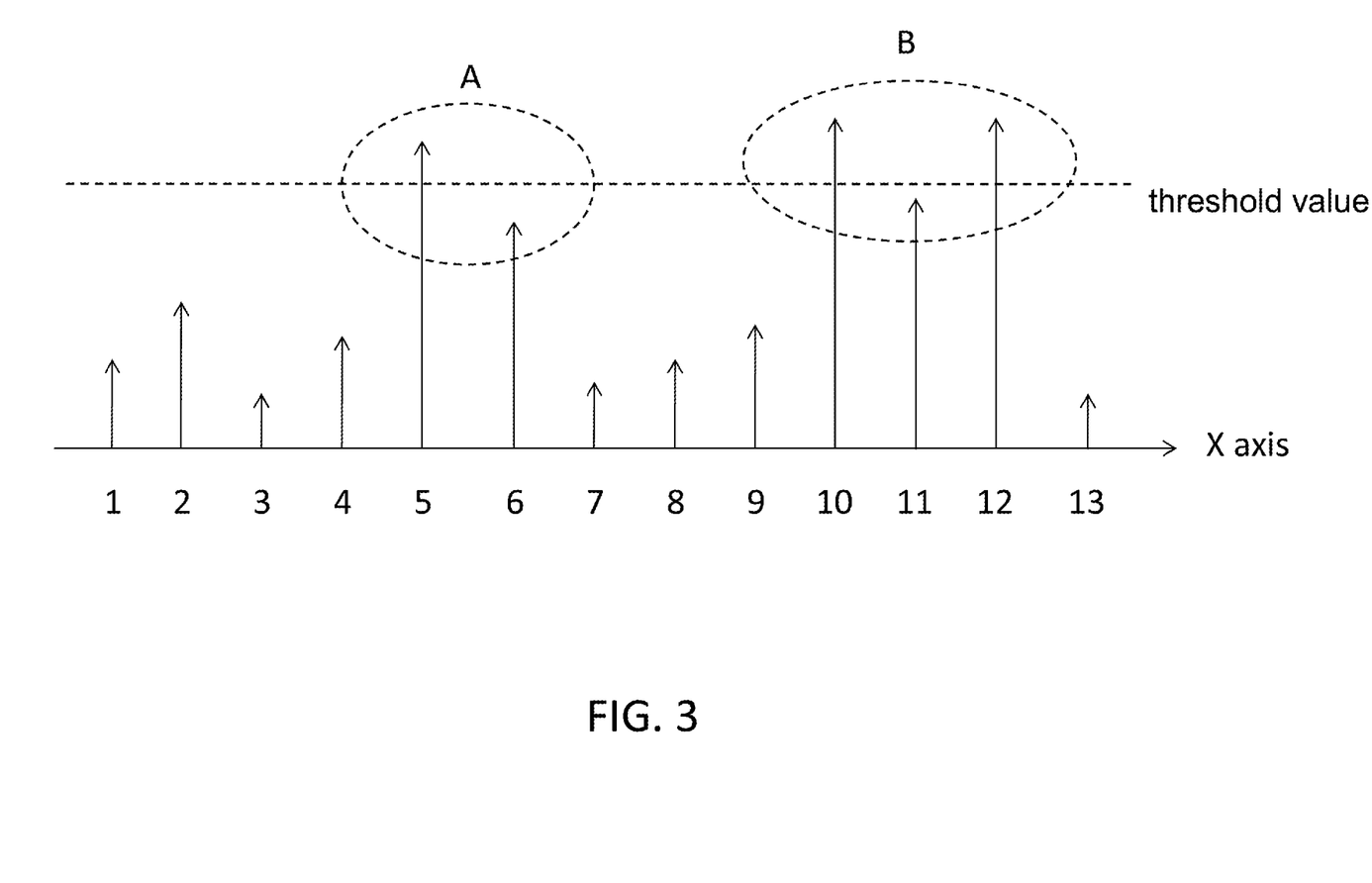
FIG. 3 is a schematic diagram showing corresponding electrical signals generated by sensors of a touch panel in response to a touch operation in accordance with an embodiment of the present disclosure.

FIG. 3 shows a schematic diagram of corresponding sensing values generated by sensors of a touch panel in response to a touch operation in accordance with an embodiment of the present disclosure. There are 13 sensors, numbered as 1 to 13, in the X axis direction are disposed on the touch panel 205. When a touch operation is performed, the sensors 1 to 13 generate corresponding sensing values according to whether areas on the touch panel 205 are touched. The counting unit 220 counts the number of the sensing values greater than the threshold value to generate a count value. For example, since there are three sensing values greater than the threshold value in FIG. 3, the count value is 3. The determining unit 225 determines a hand gesture corresponding to the touch operation according to the count value, the first reference value, the second reference value and the reference threshold value. When the count value is greater than the first reference value and is smaller than the second reference value, it is determined that the touch operation is a first hand gesture; when the count value is greater than the second reference value and is smaller than the reference threshold value, it is determined that the touch operation is a second hand gesture; and when the count value is greater than reference threshold value, it is determined the touch operation is an error operation. For example, supposing that the first reference value is 0 and the second reference value is 2, when the count value is greater than 2, it is determined that the touch operation is the second hand gesture. When the count value is smaller than 2 and is greater than 0, it is determined that the touch operation is the first hand gesture. For example, the count value in FIG. 3 is 3, and the determining unit 225 determines that the touch operation is the second hand gesture. The reference threshold value avoids error operations or noise interferences, and the determining unit 225 determines the touch operation as an error operation and omits the touch operation when the count value is greater than the reference threshold value. For example, in FIG. 3, supposing that the reference threshold value is defined as the overall number of sensors, i.e., 13, since it is impossible to have more than 13 sensors providing sensing values greater than the threshold value, the touch operation is determined as the error operation and is omitted when the count value is greater than 13. It is to be noted that, the first and second reference values and the reference threshold value are determined by a designer according to practical product properties and utilization situations, e.g., a size of the touch panel, the number of sensors (i.e., a sensitivity of the touch panel), and the like.

The hand gesture recognition apparatus and method thereof provided by the present disclosure is capable of solving the problem that cannot be solved in the prior art. The hand gesture recognition apparatus 200 directly regards the number (i.e., the count value) of the touched sensors on the touch panel 205 as a determination basis to provide a fast processing speed. In addition, since the count value is directly calculated instead of calculating the number of peaks, the misjudgment caused by touched points being too close to each other is avoided, e.g., the misjudgment caused by touch on the touch panel 205 by two fingers of a child is avoided. Taking FIG. 3 as an example, a difference between sensing values sensed by sensors is too small when the touched positions represented by the dashed ellipse B are too close to each other. In the prior art, it is misjudged that there is only one peak since the touched points are too close to each other, and thus a hand gesture made by a user with his numerous fingers is misjudged as being made with one single finger. According to the present disclosure, the number of touched sensors is taken into consideration instead of determining the number of peaks or touched points to determine the hand gesture made by the user, so as to more accurately determine a type of the hand gesture.

In the foregoing embodiment, types of hand gestures may be increased, e.g., a third reference value is defined. When the count value is greater than the first reference value and is smaller than the second reference value, it is determined that the touch operation is the first hand gesture; when the count value is greater than the second reference value and is smaller than the third reference value, it is determined that the touch operation is the second hand gesture; and when the count value is greater than the third reference value and is smaller than the reference threshold value, it is determined that the touch operation is a third hand gesture. Accordingly, the number of defined hand gestures is increased to three, and the designer may defines more reference values to define more hand gestures applications according to practical requirements.

Figure 4:
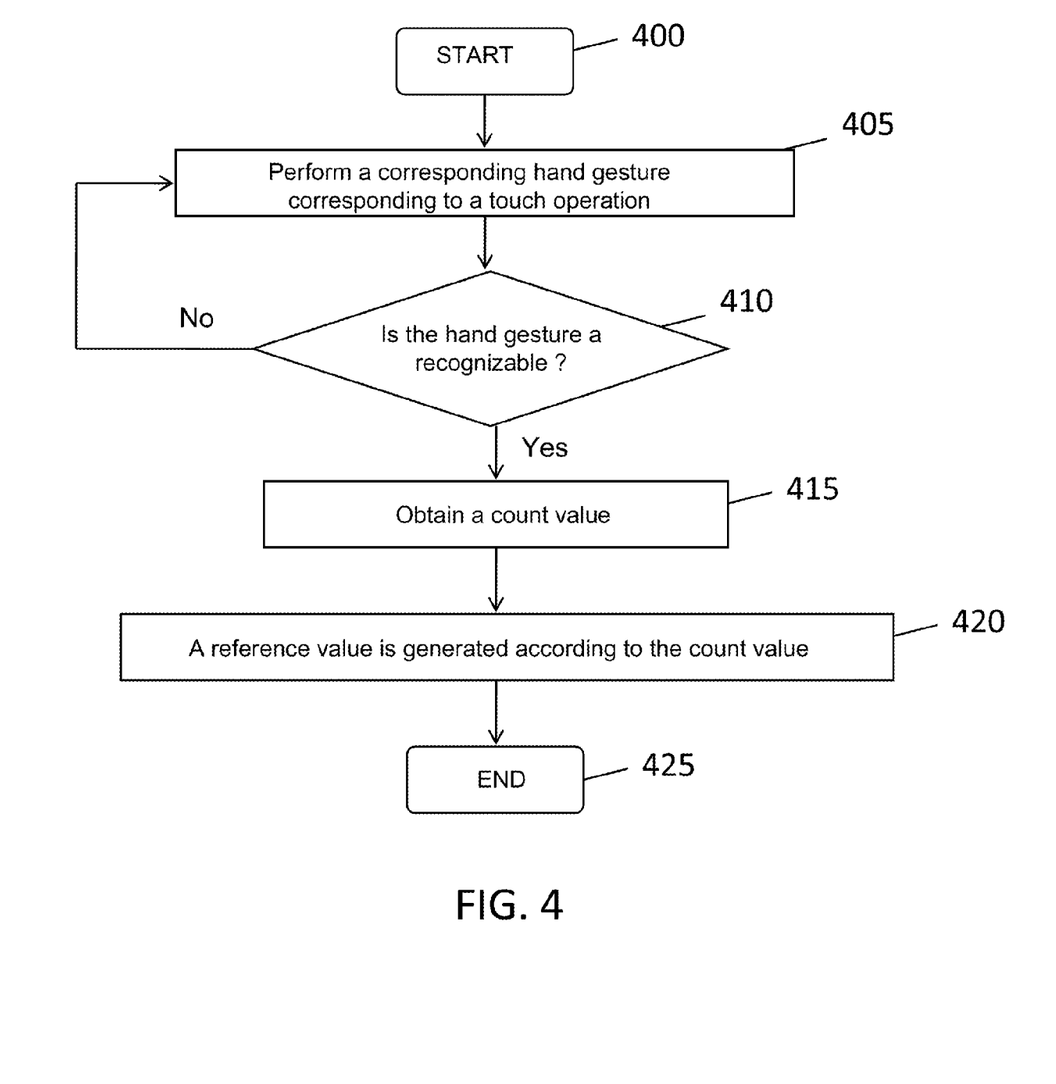
FIG. 4 is a flow chart of operations of a definition mode of a hand gesture recognition method in accordance with an embodiment of the present disclosure.

According to the present disclosure, the hand gestures and the first, second and third reference values can be defined by the hand gesture recognition apparatus 200 by performing a definition mode in which the user can define the foregoing definitions. Accordingly, the hand gesture recognition method and associated apparatus provided by the present disclosure provides more accurate flexibly determination with respect to sizes of fingers and touch habits of each user. FIG. 4 shows a flow chart of a definition mode of a hand gesture recognition method in accordance with an embodiment of the present disclosure. The method comprises steps below. In Step 400, the definition mode is activated to define associated parameters according to user utilization habits as a basis for determining a hand gesture. In Step 405, a corresponding hand gesture corresponding to a touch operation is performed, e.g., a touch with one single finger or with two fingers. In Step 410, it is determined whether the hand gesture is a recognizable hand gesture. When a determination result of Step 410 is positive, the flow proceeds to Step 415; otherwise, the flow returns to Step 405 to iterate the hand gesture. In Step 415, the sensing values of the touched sensors on the touch panel are compared with a threshold value to obtain a count value corresponding to the hand gesture. In Step 420, at least one reference value is generated according to the count value, and the generated reference value is stored into the storage 215. The definition mode ends in Step 425.

Under the definition mode, Steps 400 to 425 are iterated to define reference values of different hand gestures. Therefore, the hand gesture recognition apparatus 200 regards a definition result obtained under the definition mode as a determination basis for determining the hand gesture of the user.

Figure 5:
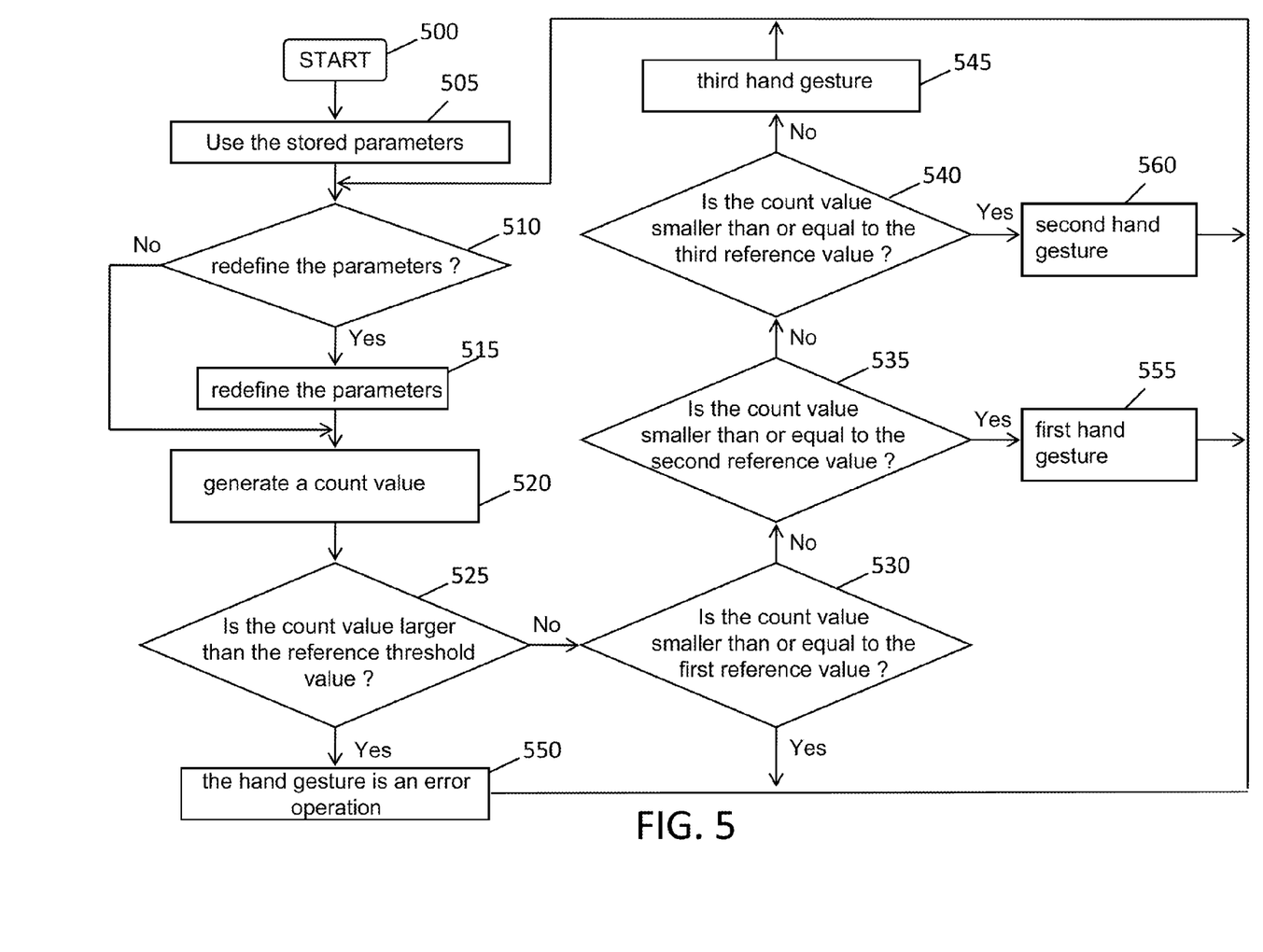
FIG. 5 is a flow chart of a hand gesture recognition method in accordance with another embodiment of the present disclosure.

FIG. 5 shows a flow chart of a hand gesture recognition method in accordance with an embodiment of the present disclosure. Taking recognition of three types of hand gestures as an example to describe the hand gesture recognition method provided by the present disclosure. The method comprises steps below. The hand gesture recognition flow begins with Step 500. In Step 505, parameters stored in the storage, e.g., the first, second and third reference values and the threshold value, are defined as predetermined definition values of the hand gesture recognition apparatus (e.g., the predetermined definition values may be designer-defined or user-defined). In Step 510, it is determined whether the foregoing parameters need to be redefined. When a determination result of Step 510 is positive, the flow proceeds to Step 515 to activate a definition mode; otherwise, Step 520 is performed to perform the hand gesture recognition flow. In Step 515, the parameters are redefined (e.g., the foregoing definition mode is activated to redefine the first, second and third reference values and the reference threshold value). In Step 520, when the user performs a touch operation, the sensing values are compared with the threshold value to regard the number of sensing values large than the threshold value as the count value. In Step 525, it is determined whether the count value is greater than the reference threshold value. When a determination result of Step 525 is positive, Step 550 is performed; otherwise, the flow proceeds to Step 530 in which it is determined whether the count value is smaller than or equal to the first reference value. When a determination result of Step 530 is positive, it is determined that no hand gesture is made on the touch panel, and thus the determination flow is iterated or the flow returns to Step 510 in which the associated parameters are redefined; otherwise, the flow proceeds to Step 535 in which it is determined whether the count value is smaller than the second reference value. When a determination result of Step 535 is positive, Step 555 is performed; otherwise, the flow proceeds to Step 540 in which it is determined whether the count value is smaller than the third reference value. When a determination result of Step 540 is positive, Step 560 is performed; otherwise, the flow proceeds to Step 545 in which determining the hand gesture as the third hand gesture, and the flow returns to Step 510 to perform a next hand gesture recognition flow. In Step 550, it is determined that the hand gesture is an error operation and is omitted, the flow returns to Step 510 in which the hand gesture recognition flow is iterated. In Step 555, it is determined that the hand gesture as the first hand gesture, and the flow returns to Step 510 to perform the next hand gesture determination flow. In Step 560, it is determined that the hand gesture as the second hand gesture, and the flow returns to Step 510 to perform the next hand gesture determination flow.

Likewise, the flow may be extended to recognize more hand gestures provided that more reference values are defined, and such modification shall not be described for brevity.

Figure 6:
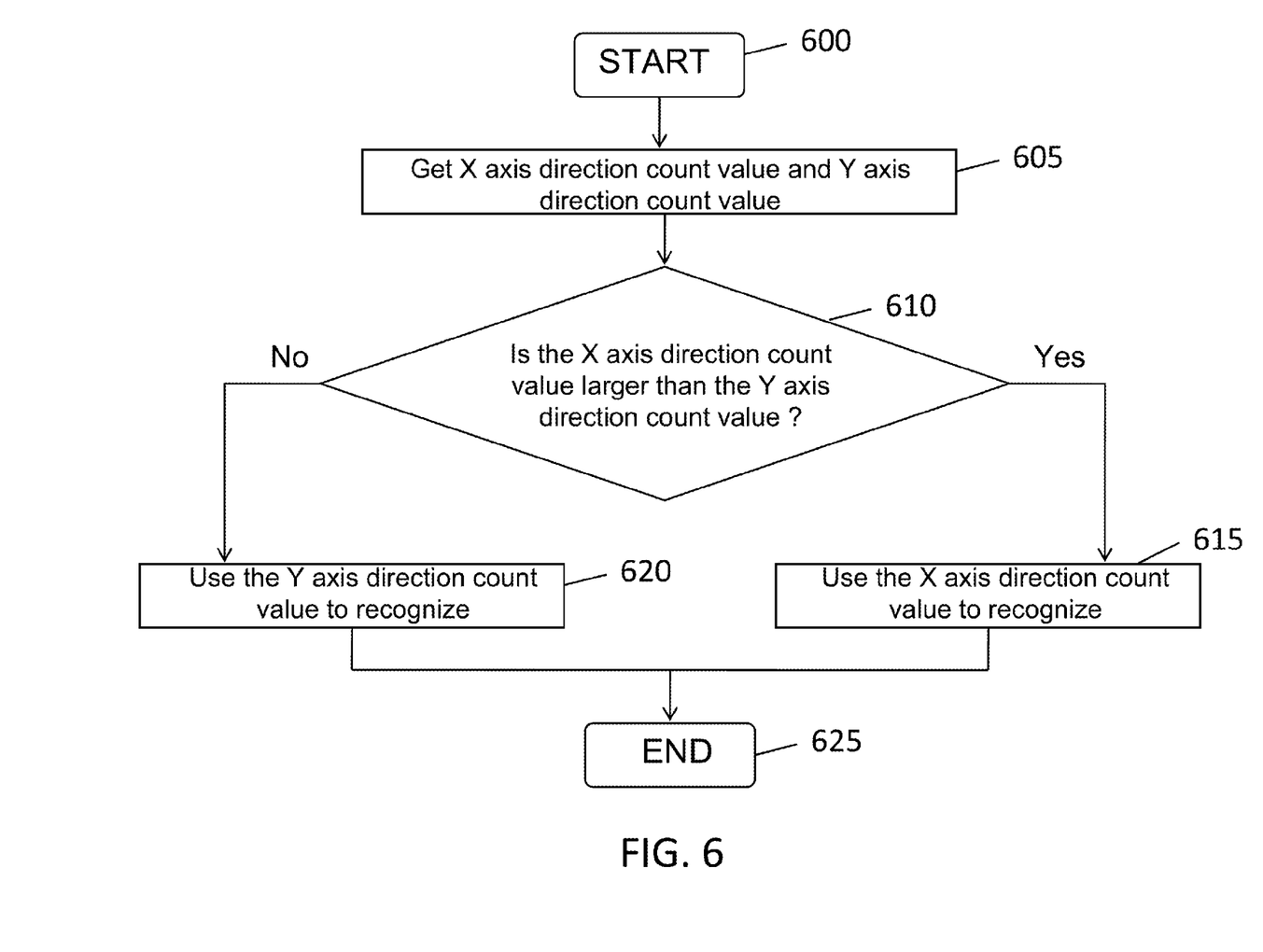
FIG. 6 is a flow chart of a hand gesture recognition method by regarding a count value of an X axis or a Y axis as a hand gesture recognition basis in accordance with an embodiment of the present disclosure.

The foregoing hand gesture recognition method for the touch panel can be extended to a two-dimensional (2D) plane, i.e., sensing values in the X axis direction and sensing values in the Y axis direction are regarded as a basis for recognizing a hand gesture. A first sensor group in the X axis direction generates a plurality of first sensing values, and a second sensor group in the Y axis direction generates a plurality of second sensing values. Accuracy of recognizing a hand gesture is increased for that the recognition is based on sensing values in more than one direction. There are a plenty of approaches for recognizing a hand gesture by combining two groups sensing values. For example, a simple approach is that, it is determined which sensor group in one direction is regarded as the recognition basis according to the number of sensors of the first and second sensor groups. More specifically, when the number of the sensors in the X axis direction is 13 and the number of the sensors in the Y axis direction is 5, it is determined that the count value generated by the sensor group in the X axis direction is regarded as the recognition basis; otherwise, when the number of the sensors in the Y axis direction is 13 and the number of the sensors in the X axis direction is 5, the count value generated by the sensor group in the Y axis direction is regarded as the recognition basis. In addition, the count values in the X axis direction and the Y axis direction are in advance obtained and are compared with each other to select a greater one between the two count values as the recognition basis. When the first approach is adopted (i.e., the numbers of sensors of the first and second sensor groups are directly compared with each other to determine which sensor group in one direction is regarded as the recognition basis), the hand gesture recognition method is similar to those in the foregoing embodiments. When the second approach is adopted (i.e., the count values generated by the first and second sensor groups are compared with each other to determine which sensor group in one direction is regarded as the recognition basis), a fourth reference value, a fifth reference value, a six reference value and a reference threshold value in the Y axis direction are defined to recognize the hand gesture, and are also redefined via the foregoing definition mode. It is to be noted that, although the hand gesture recognition approaches are similar in the X axis direction and in the Y axis direction, parameters defined in different directions need not be the same, and only one type of hand gesture is determined. For example, when the count value generated by the sensor group in the X axis direction is referred to as an X axis direction count value, the count value generated by the sensor group in the Y axis direction is referred to as a Y axis direction count value, and the X axis direction count value is large than the Y axis direction count value, the hand gestured is recognized according to the X axis direction count value and the first, second and third reference values and the reference threshold value. When the X axis direction count value is smaller than the Y axis direction count value, the hand gesture is recognized according to the Y axis direction count value and the fourth, fifth and sixth reference values and the reference threshold value. FIG. 6 is a flow chart of a hand gesture recognition method by regarding a count value of an X axis or a Y axis as a hand gesture recognition basis in accordance with an embodiment of the present disclosure. The method adopting the second approach that the count values generated by the first and second sensor groups are compared with each other to determine which sensor group in one direction is regarded as the recognition basis comprises steps below. The method begins with Step 600. In Step 605, sensing values of sensors in the X axis direction are compared with a threshold value to determine the number of the first sensing values greater than the threshold value, so as to generate an X axis direction count value; likewise, sensing values of sensors in the Y axis direction are compared with the threshold value to determine the number of the second sensing values greater than the threshold value, so as to generate a Y axis direction count value. In Step 610, it is determined whether the X axis direction count value is greater than the Y axis direction count value. When a determination result of Step 610 is positive, the method proceeds to Step 615; otherwise, the method jumps to Step 620. In Step 615, the hand gesture is recognized according to the X axis direction count value, the first, second and third reference values and the reference threshold value, and the method proceeds to Step 625. In Step 620, the hand gesture is recognized according to the Y axis direction count value, the fourth, fifth and sixth reference values and the reference threshold value, and the method proceeds to Step 625. The method ends in Step 625.

Generally, the 2D approach for recognizing a hand gesture provides better accuracy and allows higher flexibility. For example, it can be determined to correspond to certain hand gestures when the X axis direction count value is x and the Y axis direction count value is y.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A hand gesture recognition method applied to a touch panel comprising a plurality of sensors, each of the sensors generating a respective sensing value according to a touch operation, the method comprising:
   providing a first reference value, a second reference value, and a threshold value;
   generating a count value by counting a total quantity of the sensing values of the sensors on at least one axis of the touch panel that are greater than the threshold value without determining a number of peaks corresponding to touched points;
   determining the touch operation as a first hand gesture when the count value is greater than the first reference value but smaller than the second reference value; and
   determining the touch operation as a second hand gesture when the count value is greater than the second reference value.

2. The method as recited in claim 1, further comprising:
   providing a reference threshold value that is greater than the second reference value; and
   determining the touch operation as an error operation when the count value is greater than the reference threshold value.

3. The method as recited in claim 2, wherein the reference threshold value is equal to a number representative of a quantity of the sensors.

4. The method as recited in claim 1, further comprising:
   activating a definition mode to perform the touch operation corresponding to the first hand gesture; and
   generating the second reference value according to the count value to provide the second reference value.

5. The method as recited in claim 1, the sensors comprising a first sensor group that generate a plurality of first sensing values in a first direction and a second sensor group that generate a plurality of second sensing values in a second direction, the method further comprising:
   generating the count value according to a number representative of a quantity of the first sensing values greater than the threshold value when a quantity of sensors in the first sensor group is greater than a quantity of sensors in the second sensor group.

6. The method as recited in claim 1, wherein the sensors comprise a first sensor group that generate a plurality of first sensing values in a first direction and a second sensor group that generate a plurality of second sensing values in a second direction, and wherein generating the count value comprises:
   counting a quantity of the first sensing values that are greater than the threshold value to generate a first direction count value;
   counting a quantity of the second sensing values that are greater than the threshold value to generate a second direction count value; and
   regarding the first direction count value as the count value when the first direction count value is greater than the second direction count value, and regarding the second direction count value as the count value when the first direction count value is smaller than the second direction count value.

7. A hand gesture recognition apparatus applied to a touch panel comprising a plurality of sensors, each of the sensors generating a respective sensing value according to a touch operation, the apparatus comprising:
   a storage that stores a first reference value, a second reference value, and a threshold value;
   a counter that generates a counter value by counting a total quantity of the sensing values of the sensors on at least one axis of the touch panel that are greater than the threshold value without determining a number of peaks corresponding to touched points; and
   a determining unit that determines the touch operation as a first hand gesture when the count value is greater than the first reference value but smaller than the second reference value, and that determines the touch operation as a second hand gesture when the count value is greater than the second reference value.

8. The hand gesture recognition apparatus as recited in claim 7, wherein the storage further stores a reference threshold value greater than the second reference value, and wherein the determining unit determines the touch operation as an error operation when the count value is greater than the reference threshold value.

9. The hand gesture recognition apparatus as recited in claim 8, wherein the reference threshold value is equal to a number representative of a quantity of the sensors.

10. The hand gesture recognition apparatus as recited in claim 7, wherein the sensors comprise a first sensor group that generate a plurality of first sensing values in a first direction and a second sensor group that generate a plurality of second sensing values in a second direction, and wherein the counter generates the count value according to a quantity of the first sensing values that are greater than the threshold value when a number representative of a quantity of the sensors in the first sensor group is greater than a number representative of a quantity of the sensors in the second sensor group.

11. The hand gesture recognition apparatus as recited in claim 7, wherein the sensors comprises a first sensor group that generate a plurality of first sensing values in a first direction and a second sensor group that generate a plurality of second sensing values in a second direction, and wherein the counter counts a quantity of the first sensing values that are greater than the threshold value to generate a first direction count value, counts a quantity of the second sensing values that are greater than the threshold value to generate a second direction count value, regards the first direction count value as the count value when the first direction count value is greater than the second direction count value, and regards the second direction count value as the count value when the first direction count value is smaller than the second direction count value.

* * * * *